(12) United States Patent
Faerber et al.

(10) Patent No.: US 8,355,444 B2
(45) Date of Patent: Jan. 15, 2013

(54) ENCODING OF A PLURALITY OF INFORMATION SIGNALS USING A JOINT COMPUTING POWER

(75) Inventors: Nikolaus Faerber, Erlangen (DE); Herbert Thoma, Erlangen (DE); Christian Forster, Nuremberg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 449 days.

(21) Appl. No.: 12/530,649

(22) PCT Filed: Mar. 13, 2008

(86) PCT No.: PCT/EP2008/002015
§ 371 (c)(1),
(2), (4) Date: Jan. 6, 2010

(87) PCT Pub. No.: WO2008/113510
PCT Pub. Date: Sep. 25, 2008

(65) Prior Publication Data
US 2010/0104017 A1 Apr. 29, 2010

(30) Foreign Application Priority Data
Mar. 19, 2007 (DE) .......................... 10 2007 013 026

(51) Int. Cl.
*H04B 1/66* (2006.01)
*H04N 7/12* (2006.01)
(52) U.S. Cl. .............. 375/240.16; 375/240.03
(58) Field of Classification Search ............... 348/385.1, 348/387.1, 407, 406, 402.1, 409.1, 459, 416, 348/403.211; 375/240.01–240.26; 382/239
See application file for complete search history.

(56) References Cited

U.S. PATENT DOCUMENTS 6,195,388 B1   2/2001   Choi et al.
6,490,250 B1   12/2002  Hinchley et al.
(Continued)

FOREIGN PATENT DOCUMENTS
EP            0888009         12/1996
(Continued)

OTHER PUBLICATIONS

IEEE, Lilla Boroczky, Joint Rate Control with Look-Ahead for Multi-Program Video Coding, Oct. 2000, vol. 10, pp. 1159-1163.*
(Continued)

*Primary Examiner* — Behrooz Senfi
(74) *Attorney, Agent, or Firm* — Michael A. Glenn; Glenn Patent Group

(57) ABSTRACT

A device for encoding a plurality of information signals using a joint computing power includes a plurality of encoders for encoding a respectively different one of the information signals using the joint computing power, wherein each encoder is controllable via at least one respective encoding parameter with regard to its encoding complexity/encoding distortion performance. A provider for providing, for each of the encoders, signal-dependent information dependent on the respective information signal and indicating an encoding distortion of the respective encoder, and a setter for setting the encoding parameters depending on the signal-dependent information considering the joint computing power such that a combination of encoding complexities of the encoders does not exceed a value dependent on the joint computing power are also provided, wherein the setter for setting and the plurality of encoders cooperates such that, with regard to subsequent time intervals, a distribution of the joint computing power depends on the encoding parameters or an encoding complexity of the individual encoders.

28 Claims, 6 Drawing Sheets

U.S. PATENT DOCUMENTS

| | | | |
|---|---|---|---|
| 6,748,019 | B1 | 6/2004 | Lin et al. |
| 6,956,901 | B2 * | 10/2005 | Boroczky et al. ......... 375/240.03 |
| 7,551,673 | B1 * | 6/2009 | Oh et al. ................... 375/240.16 |
| 2001/0000675 | A1 * | 5/2001 | Obikane et al. ............ 348/385.1 |
| 2006/0224762 | A1 * | 10/2006 | Tian et al. ...................... 709/231 |

FOREIGN PATENT DOCUMENTS

WO     WO2006/099695     9/2006

OTHER PUBLICATIONS

Ortega, A. et al.; "Rate-distortion methods for image and video compression", Nov. 1998; Signal Processing Magazine, IEEE, vol. 15, No. 6, pp. 23-50.

Balakrishnan et al., "Benefits of statistical multiplexing in multi-program broadcasting", Sep. 1997; in Proceedings of Int. Broadcasting Convention, pp. 560-565.

Garret, M.W. et al., "Joint source/channel coding of statistically multiplexed real-time services on packet networks", Feb. 1993; IEEE/ACM Transactions on Networking, vol. 1, No. 1, pp. 71-80.

Kwon et al., "Performance and computational complexity optimization in configurable hybrid video coding system", Jan. 2006; IEEE Transactions on Circuits and Systems for Video Technology, vol. 16, No. 1, pp. 31-42.

Li, Ping et al.; "Design and implementation of parallel video encoding strategies using divisable load analysis", 2005; IEEE Transactions on Circuits and Systems for Video Technology, vol. 15, No. 7CDVT-1, pp. 1098-1112.

Wang, et al.; "Load Sharing in Distributed Systems", Mar. 1985; IEEE Transactions on Computers; vol. C-34, No. 3, pp. 204-217.

Kannangara, C.S. et al.; "Computational Management of an H.264 Encoder", Apr. 24-26, 2006, Special Session on "Energy-Aware Video Communication" at the 25th Picture Coding Symposium, 6 pages, Beijing, China.

Kwon et al., "Performance and computational complexity optimization in configurable video coding system", Mar. 16, 2003; IEEE Wireless Communications and Networking WCNC 2003, pp. 2086-2089.

He, Zhihai, et al.; "Energy Saving for Portable Video Communication Devices Using Power-Rate-Distortion Analysis and Control", Apr. 24-26, 2006, Special Session on "Energy-Aware Video Communication" at the 25th Picture Coding Symposium, 4 pages, Beijing, China.

Liang, Ke et al.; "An Energy-Aware MCI-Load Schedule Strategy for Distributed Video Coding over Ad-Hoc Networks", Apr. 24-26, 2006, Special Session on "Energy-Aware Video Communication" at the 25th Picture Coding Symposium, 4 pages, Beijing, China.

Lu, Meng-Ting et al.; "Block-Based Computation Adjustment for Complexity-Aware Live Streaming Systems", Apr. 24-26, 2006, Special Session on "Energy-Aware Video Communication" at the 25th Picture Coding Symposium, 5 pages, Beijing, China.

Lu, Xiaoan et al.; "Power Efficient Wireless Video Communications Over CDMA Networks", Apr. 24-26, 2006, Special Session on "Energy-Aware Video Communication" at the 25th Picture Coding Symposium, 6 pages, Beijing, China.

Xiao, Hongjiang et al.; "Network-aware and Decoding Complexity-adaptive Wireless Video Service System for Resource-limited Mobile Terminals", Apr. 24-26, 2006, Special Session on "Energy-Aware Video Communication" at the 25th Picture Coding Symposium, 5 pages, Beijing, China.

The Int'l Preliminary Report on Patentability, English Translation, mailed Oct. 15, 2009, 9 pages.

\* cited by examiner

ENCODING OF A PLURALITY OF INFORMATION SIGNALS USING A JOINT COMPUTING POWER

CROSS-REFERENCE TO RELATED APPLICATIONS

This application is a U.S. national entry of PCT Patent Application Serial No. PCT/EP2008/002015 filed 13 Mar. 2008, and claims priority to German Patent Application No. 102007013026.2 filed 19 Mar. 2007, which are incorporated herein by references in their entirety.

BACKGROUND OF THE INVENTION

The present invention generally relates to encoding a plurality of information signals using a joint computing power and in particular to controlling a plurality of encoding means for encoding a plurality of information signals using a joint computing power.

Regarding the different ways of encoding and/or compressing information signals, like, e.g., audio or video signals, a difference may be made between lossless encoding on the one hand and lossy encoding on the other hand. Lossless encoding technologies reduce the number of bits needed for representing the information signal by a redundancy reduction. Lossy encoding technologies, on the contrary, are alternatively or additionally based on an irrelevance reduction, according to which signal information of the information signal may be omitted which, although it leads to an interference with regard to the original information signal in decoding and/or reconstruction, is, compared to the compression rate, usually comparatively low or possibly even not perceivable for human perception, e.g. hearing or sight.

Lossy compression is usually an object of multimedia signal compression. It is the object of the multimedia signal compression to represent an original signal, e.g., an audio or a video signal having a certain bit rate R minimizing the introduced interference and/or the introduced distortion D. This is referred to as rate/distortion optimization. By increasing R, it is typically possible to reduce D. This compromise may, for example, be controlled by the quantization step size Q. Minimizing D for a given target bit rate R has already frequently been the subject of studies, wherein reference is, for example, made to A. Ortega, A., Ramchandran, K., "Rate-distortion methods for image and video compression", Signal Processing Magazine, IEEE, Vol. 15, No. 6, November 1998, pages 23-50, which deals with video compression.

In RD optimization it is to be considered that the RD performance in operation, i.e. the RD performance for a certain encoder implementation is typically signal-dependent and changes over time. RD optimization here is a continuous process and not a one-time design process in the development of the encoder.

As an extension of the classical RD optimization task, it is possible to consider several programs, e.g. P, together, such as, e.g., several programs p with p=1 . . . P, which share a common target bit rate and/or overall bit rate R and are encoded together. A first approach in such a joint encoding might be to distribute the bit rate uniformly among the programs, i.e. to constantly encode each program with a fixed bit rate R(p)=R/P=constant. It is advantageous, however, to dynamically distribute the bit rate among the signals, depending on the signal and time-dependent RD performance in each program.

It is to be assumed, for example, that each program is divided into time segments s with s=1 . . . S and with S being the number of considered segments, wherein each segment takes a fixed time T, e.g., T=2 seconds. In this case, the operational RD performance is given by D(R,p,s) and the overall distortion in the programs may be minimized by changing the bit allocation between the programs in a dynamic way from segment to segment, i.e. by setting R(p,s). If these RD data are known, a plurality of optimization technologies are available which may be used. The possible R/D gain results from the fact that within each segment programs usually exist which are "easy" to be encoded and others which are "difficult" to be encoded. Consequently, a reserve bit rate may be allocated to the program which profits most from it. No gain would then be obtainable if all programs showed the same RD performance. As this is very improbable from a statistical point of view, however, it is advantageous to multiplex programs and, in doing so, dynamically allocate the encoding rate. This is referred to as a statistical multiplex and is, for example, described in the following publications: Balakrishnen et al., "Benefits of statistical multiplexing in multi-program broadcasting", in Proceedings of Int. Broadcasting Convention, September 1997, pp. 560-565, M. W. Garret et al., "Joint source/channel coding of statistically multiplexed real-time services on packet networks", IEEE/ACM Transactions on Networking, Vol. 1, No. 1, pp. 71-80, 1993, and U.S. Pat. No. 6,195,388.

Apart from the encoding rate R and the distortion D a further important parameter exists for a practical implementation, i.e. the complexity C, which is measured, for example, in CPU cycles or million instructions per second (MIPS). Typically, the RD performance may be improved by adding more complexity to the encoder and/or the decoder. Consequently, with the same bit rate the distortion may be reduced if more processing power is available. This performance may be observed in many generations of codecs and/or coding schemes over time, e.g., using the H.261, H.263 and H.264 encoding schemes in case of video encoding. The improvement of the RD performance with complexity increases may, however, also be observed within a certain implementation of an encoding scheme when certain encoding tools are activated or deactivated or a search depth is decreased or the like. For video encoding it is possible, for example, to prevent the complex motion estimation and motion compensation used for encoding the predicted frames (P frames) or bidirectional predicted frames (B frames) or to only use intra-encoded frames (I frames). This will typically deteriorate the RD performance but also significantly reduce the complexity. Such a change of the encoding complexity and/or such changes in encoding strategy may be executed at the encoder mainly in a way which is according to standard, i.e. necessitates no changes in the decoder.

Software encoders now utilize the above-mentioned complexity considerations, as they comprise an optimization control in order to control the CD compromise. For example, a controller may show five optimization levels from "fastest" to "best quality" to enable a user to perform a manual setting. Within an encoder even a less granular, maybe even continuous control is possible by varying different encoding parameters, such as, e.g., the frame type, the search space, etc. Like in the case of RD optimization, the operational CD performance is typically signal-dependent and changes over time.

The minimization of D for a given complexity limit Cmax is discussed, for example, in Kwon et al., "Performance and computational complexity optimization in configurable hybrid video coding systems", IEEE Transactions on Circuits and Systems for Video Technology, pp. 31-42, Vol. 16, No. 1, 2006, Ping Li, Veervalli, Kassim, "Design and implementation of parallel video encoding strategies using divisable load analysis", IEEE Transactions on Circuits and Systems for Video Technology, pp. 1098-1112, Vol 15, No. 7CDVT-1, 2005, and in a special session with the title "Energy-Aware Video Communication" at the Picture Coding Symposium, 2006, Beijing, China.

One topic in the realization of encoders is also load balancing. Load balancing is a technology to distribute work/load between many computers, processes, plates or other resources and/or equipment to obtain an optimum resource utilization and/or calculation time period. In general, this is described, for example, in Yung-Temg Wang, Morris, R. J. T., "Load Sharing in Distributed Systems", Computers, IEEE Transactions on, Vol. C-34, No. 3, March 1985, pages 204-217. In U.S. Pat. No. 6,748,019, for example, load balancing between two sequential members of a hybrid encoding scheme is described, i.e. the motion compensation part on the one hand and the residual signal encoding part on the other hand, to prevent in this way the occurrence of idle times in one of the two members.

Back to the encoding of several information signals, it would now be desirable to have a possibility of being able to execute this joint encoding more efficiently.

SUMMARY

According to an embodiment, a device for encoding a plurality of information signals using a joint computing power may have a plurality of encoders for encoding a respectively different one of the information signals using the joint computing power, wherein each encoder is controllable via at least one respective encoding parameter with regard to its encoding complexity/encoding distortion performance; a provider for providing information for each of the encoders which depends on the respective information signal and indicates an encoding distortion of the respective encoder; and a setter for setting the encoding parameters depending on the signal-dependent information considering the joint computing power such that a sum of encoding complexities of the encoders does not exceed a value which depends on the joint computing power, wherein the setter for setting and the plurality of encoders cooperate such that with regard to subsequent time intervals a distribution of the joint computing power depends on the encoding parameters or an encoding complexity of the individual encoders.

According to a further embodiment, a method for encoding a plurality of information signals using a plurality of encoders for encoding a respectively different one of the information signals using the joint computing power, wherein each encoder is controllable via at least one respective encoding parameter with regard to its encoding complexity/encoding distortion performance may have the steps of providing, for each of the encoders, signal-dependent information depending on the respective information signal and indicating an encoding distortion of the respective encoder; and setting the encoding parameters depending on the signal-dependent information considering the joint computing power such that a combination of encoding complexities of the encoders does not exceed a value which depends on the joint computing power, wherein the step of setting and the plurality of encoders cooperate such that, with regard to subsequent time intervals, a distribution of the joint computing power depends on the encoding parameters or an encoding complexity of the individual encoders.

According to a further embodiment, a device for encoding a plurality of video signals using a joint computing power may have a plurality of video encoders for encoding a respectively different one of the video signals using the joint computing power, wherein the video encoders are implemented to execute a motion-compensated estimation of frames and a lossy encoding of an error of the motion-compensated estimation; a provider for providing, for each of the video encoders, signal-dependent information depending on the respective video signal and indicating an encoding distortion of the respective video encoder; and a setter for setting encoding parameters of the plurality of video encoders depending on the signal-dependent information, wherein the encoding parameters relate to the motion-compensated estimation and influence an encoding complexity of the video encoders.

According to a further embodiment, a method for encoding a plurality of video signals using a plurality of video encoders for encoding a respectively different one of the video signals using the joint computing power, wherein the video encoders are implemented to execute a motion-compensated estimation of frames and a lossy encoding of an error of the motion-compensated estimation may have the steps of providing, for each of the video encoders, signal-dependent information depending on the respective video signal and indicating an encoding distortion of the respective video encoders; and setting encoding parameters of the plurality of video encoders depending on the signal-dependent information, wherein the encoding parameters relate to the motion-compensated estimation and influence an encoding complexity of the video encoders.

According to a further embodiment, a computer program may have a program code for executing the method for encoding a plurality of information signals using a plurality of encoders for encoding a respectively different one of the information signals using the joint computing power, wherein each encoder is controllable via at least one respective encoding parameter with regard to its encoding complexity/encoding distortion performance, which may have the steps of providing, for each of the encoders, signal-dependent information depending on the respective information signal and indicating an encoding distortion of the respective encoder; and setting the encoding parameters depending on the signal-dependent information considering the joint computing power such that a combination of encoding complexities of the encoders does not exceed a value which depends on the joint computing power, wherein the step of setting and the plurality of encoders cooperate such that, with regard to subsequent time intervals, a distribution of the joint computing power depends on the encoding parameters or an encoding complexity of the individual encoders, when the computer program is executed on a computer.

According to a further embodiment, a computer program may have a program code for executing the method for encoding a plurality of video signals using a plurality of video encoders for encoding a respectively different one of the video signals using the joint computing power, wherein the video encoders are implemented to execute a motion-compensated estimation of frames and a lossy encoding of an error of the motion-compensated estimation, which may have the steps of providing, for each of the video encoders, signal-dependent information depending on the respective video signal and indicating an encoding distortion of the respective video encoders; and setting encoding parameters of the plurality of video encoders depending on the signal-dependent information, wherein the encoding parameters relate to the motion-compensated estimation and influence an encoding complexity of the video encoders, when the computer program is executed on a computer.

It is a finding of the present invention that a more efficient encoding of a plurality of information signals using a joint computing power may be enabled by the fact that the joint computing power for encoding each of the plurality of information signals is distributed depending on signal-dependent information depending on the plurality of information signals among the encoding means of the individual information signals. The overall distortion caused by the encoding of the plurality of information signals may be reduced or optimized by allocating more computing power to those encoding means, using the typical CD ratio in the encoding of information signals, for which, from the higher computing power allocation an improved quality and/or a lower distortion results, and that a lower computing power is allocated to those encoding means for which this reduced allocation results in a comparatively lower distortion increase and/or quality decrease. According to one aspect, with reference to this central idea, an encoding parameter setting of the plurality of encoding means is changed considering the joint computing power such that a sum of encoding complexities (C) of the encoding means does not exceed a value dependent on the joint computing power. According to one aspect, this central idea is taken up by the fact that the encoding parameters of a plurality of video encoding means ($58_1$-$58_P$) which are implemented to execute a motion-compensated estimation of frames and a lossy encoding of an error of the motion-compensated estimation are set depending on the signal-dependent information which relates to motion-compensated estimation and influence an encoding complexity of the video encoding means ($58_1$-$58_P$).

According to one embodiment of the present invention, for determining the allocation of the joint computing power among the coding means and/or for setting the encoding parameters, the CD performance at the individual encoding means and/or of the individual information signals is probed by intermittently changing the encoding parameters of the individual encoding means to more complex and/or less complex settings, and evaluating the resulting change of the distortion and computing complexity of the encoding means. If it results that a redistribution of the joint computing power and/or a resetting of the encoding complexities results in a lower overall distortion, the computing power will be redistributed accordingly, and also the encoding parameters of the encoding means whose computing power has been reset are accordingly adapted, e.g., to the encoding parameters used during probing out.

According to a further embodiment of the present invention, the distribution of the joint computing power and/or the setting of the encoding parameters is linked to a distribution of a joint available maximum overall encoding rate to thus reduce a cost function which depends on the overall distortion.

According to a further embodiment of the present invention, an input-side intermediate storage is connected upstream to each encoding means, wherein, in response to a signal from an input-side intermediate storage at the respective encoding means which indicates that the same tends to become full, a redistribution of the joint computing power is executed such that more computing power is allocated to the respective encoding means.

Similarly, according to a further embodiment, upon a signal from an output-side intermediate storage of an encoding means a bite rate of the corresponding encoding means is increased at the expense of the other encoding means. An input-side and/or output-side intermediate storage thus enables a temporary loosening of the side condition of maintaining the maximum available computing power and/or maximum available overall bit rate.

BRIEF DESCRIPTION OF THE DRAWINGS

In the following, embodiments of the present invention are explained in more detail with reference to the accompanying drawings, in which.

DETAILED DESCRIPTION OF THE INVENTION

Figure 1:
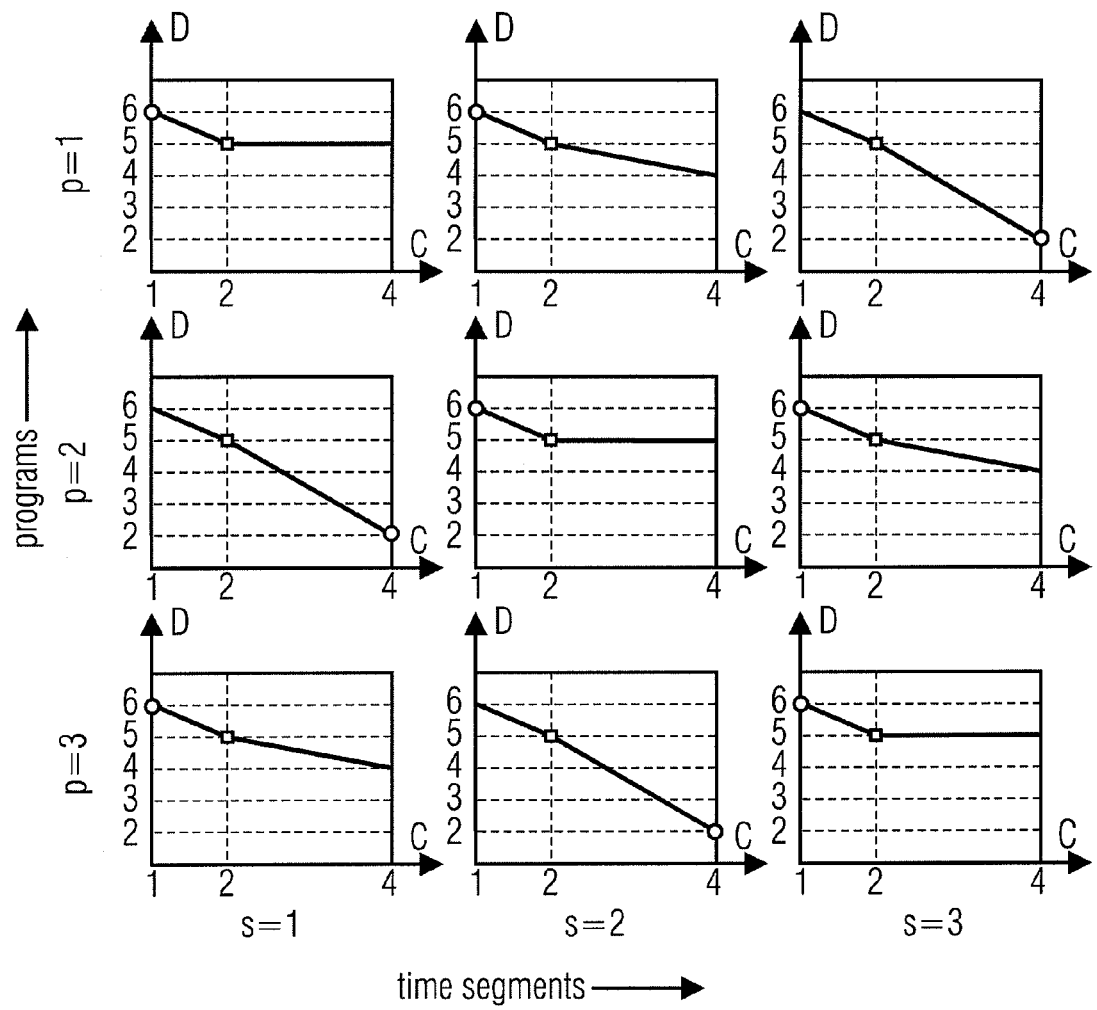
FIG. 1 shows a schematical illustration of an exemplary CD performance for an example of three programs over, e.g., three time segments for illustrating the possible distortion reduction by complexity distribution.

Before, with reference to FIGS. 2-6, embodiments of the present invention for a device for encoding a plurality of information signals using a joint computing power are described, in the following, as an introduction, reference is made to a few points which apply to all these embodiments and are useful for understanding the functioning and the advantages of these embodiments. Here, in the following, and with reference to the embodiments in FIGS. 2-6, it is first of all assumed that the plurality of information signals to be encoded are video signals, such as, e.g., television programs. The present invention may easily be also applied to other information signals, such as, e.g., audio signals as it is still to be discussed at the end of the description of the figures.

The following embodiments offer a possibility for minimizing the distortion for the encoding of several programs to one single and/or common processing platform, e.g. the encoding of P programs with P being an integer number greater than 1. The processing platform is able, for example, to deal with the overall complexity C and may here comprise several CPUs and/or CPU cores. For each of the programs now an encoding means and/or an encoder for coding a respective program of the P programs is provided. In particular it is now possible according to the following embodiments to dynamically allocate the processing power among the P encoders, i.e. without associated significant losses. This is possible, for example, by implementing each of the encoders in the form of software, i.e. as a program which may be executed on the processing platform. In this case, the dynamic allocation and/or distribution of the overall processing power may be achieved by allocating a respective and temporally variable portion of sequential processing cycles of the processing platform to those encoding programs. According to the embodiments described in the following, now the dynamic distribution of the overall processing power and/or overall computing power of the processing platform is executed such that the overall distortion, which is, for example, defined as an average distortion of the encoded information signals, is reduced or that an overall quality is increased, which is, for example, defined as an average quality of the encoded information signals.

The connection between the computing power on the one hand and the encoding distortion and/or encoding quality on the other hand are briefly explained in the following. As already explained in the introductory part of the description, the operational CD performance is signal-dependent. That means, the dependence will be different for each program p with p=1, ..., P and each time segment s=1, ..., S. With a known performance characterized by D(C,p,s), it is possible to distribute processing power in an optimum way among the P encoders such that the overall distortion is reduced and/or minimized. With known CD data, different optimization technologies exist which may be used to make a function depending on the overall distortion extremal and by this reduce the overall distortion. Some optimization technologies are described in the following with reference to the embodiments. As a result of optimization, the available processing platform may be used more efficiently, i.e. a better quality for the same maximum load results or, looked at from a different perspective, more programs may be encoded on the same processing platform with the same quality.

FIG. 1 now illustrates how this improvement results. In particular, FIG. 1 illustrates a change of the CD performance for an example of P=3 programs over a time period of three time segments, i.e. S=3. In particular, FIG. 1 exemplarily shows for each program p for each of the time segments s the current CD performance by a respective graph, wherein along the horizontal axis the complexity C and along the vertical axis the distortion D is plotted. It is the tendency that the CD performance of each program p at each time segment s shows such a performance that an increase of complexity leads to a reduction of the distortion. The degree of the reduction per complexity increase, i.e. the increase of the CD performance, is different for the different programs p and for the different time segments s.

In the example of FIG. 1 it is now assumed that the overall available processing power $C_{max}=6$. To allow no misunderstandings to occur, this assumption is still to be specified. The complexity C of the encoding of one of the programs p is measured, for example, by the number of needed CPU cycles which are needed in the presence of a predetermined CPU instruction set in order to execute the encoding. Different complexities C for encoding a program result, for example, from the use of different encoding parameters. The assumption that the overall available processing power $C_{max}=6$ is now interpreted, for example, such that the processing power is merely sufficient to execute a program of the complexity C=6 in the time period of one segment. Only when the overall complexity for encoding the three programs of FIG. 1 does not exceed the overall available processing power per time segment is it guaranteed for each time segment that the encoding of all programs does not need more time than the time period of one segment. In this respect it is now possible to use the same/fixed allocation and/or distribution of the overall available processing power for each of the programs p, which in the example of FIG. 1 lead to the fact that to each program and/or each program coding a processing power of $C_{max}/3=2$ units would be allocated, which is indicated in FIG. 1 by the square points in the CD courses. As it may be seen, in this case the average distortion, for example in the segment s=1 is (5+5+5)/3=5. In this time segment, however, a lower distortion may be achieved when the load for the processing platform is distributed differently, i.e. allocated dynamically depending on the CD performance of the individual program codings. The processing power distribution which leads to the respectively lowest possible overall distortions per time segment in the respective segments s in the example of FIG. 1 is illustrated using circular points in the CD courses of FIG. 1. For example, in the time segment s=1, a distribution of the computing power such that for the encoding of the program p=1 the encoding complexity C(1)=1 allocating a portion of ⅙ of the overall processing power, an encoding complexity of C(2)=4 for the encoding of the program p=2 allocating ⅘ of the overall processing power and a coding complexity of C(3)=1 for the encoding of the program p=3 allocating ⅙ of the available overall processing power are allocated, leads to an average distortion of the encoding program of (6−2−6)/3=4.66, which is less than the preceding result of 5, and that, maintaining a possible side condition regarding the coding speed for encoding the individual time segments despite the high coding complexity for the second signal, as the increased computing power enables processing more coding tasks in the same time period. Consequently, with the same complexity a lower distortion is achieved.

For the sake of completeness, it is noted here that the distortion D may be defined as the MSE and/or the mean square error of the pixel values of the decoded program content relative to the original program content. Alternative definitions are also possible.

Figure 2:
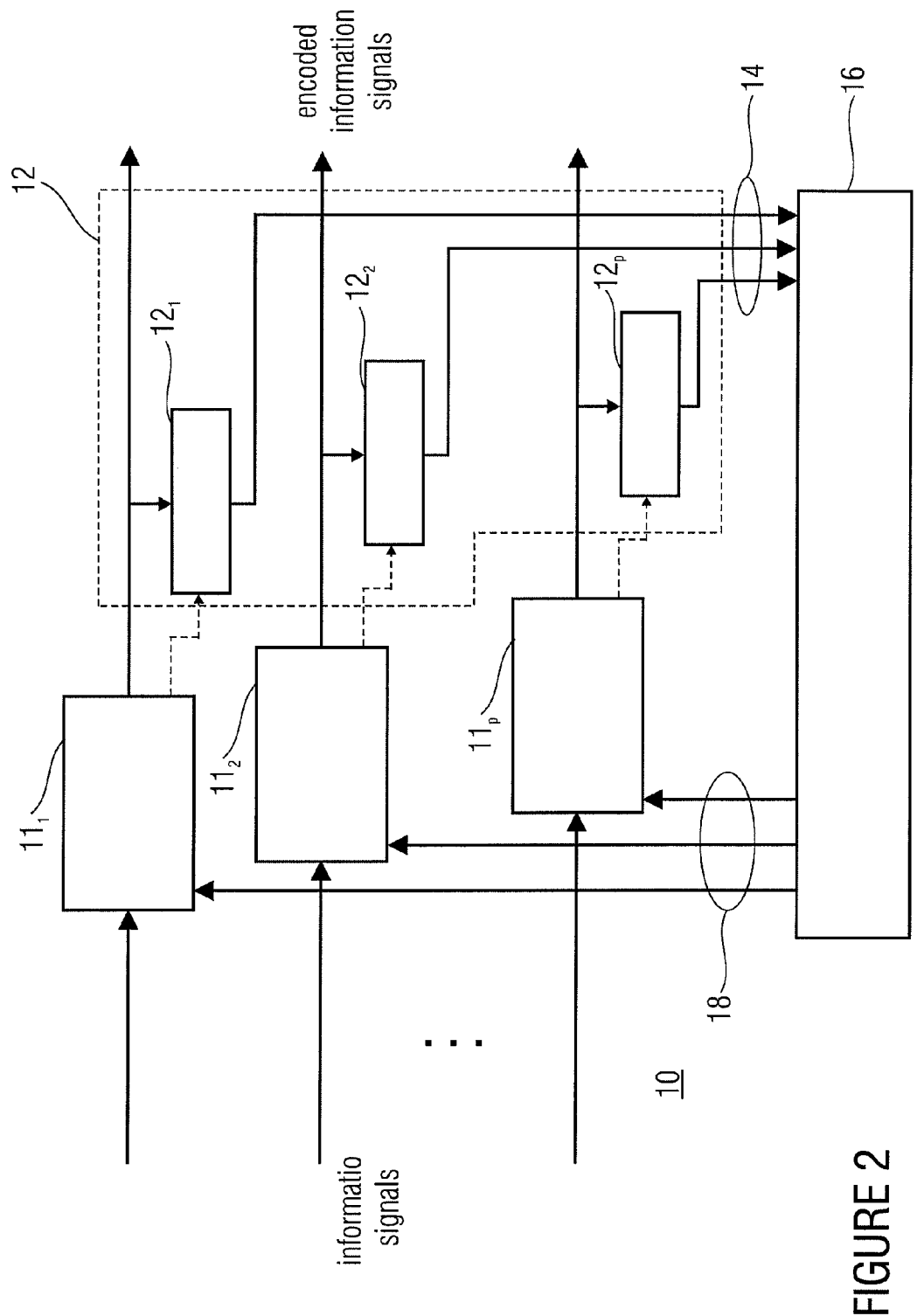
FIG. 2 shows a block diagram of a device for encoding a plurality of information signals using a joint computing power according to an embodiment of the present invention.

After the introduction with reference to FIG. 1, in the following, with reference to FIG. 2, a device for encoding a plurality of information signals using a joint computing power is to be described according to one embodiment of the present invention. The device generally designated by 10 in FIG. 2 includes a plurality of coding means $11_1$-$11_p$ for encoding a different one of the information signals $s_1$-$s_p$ each. The plurality of encoding means $11_1$-$11_p$ use a joint computing power for encoding. They are, for example, implemented together on a computer or another computing platform and thus share the available computing power, i.e. the capability to execute a certain number of coding tasks and/or instructions in a fixed time period. Each encoding means is controllable via at least one respective encoding parameter $X_1$-$X_p$ with regard to its encoding complexity/encoding distortion performance. The entirety of the encoding parameters $X_1$-$X_p$ is designated by 18. A means 12 is provided to provide signal-dependent information 14 for each of the encoding means $11_1$-$11_p$ which depend on the respective information signal. The signal-dependent information 14 for example represents an encoding distortion D, a bit rate R and/or a complexity C. A means 16 serves for setting the encoding parameters $X_1$-$X_p$ (18) depending on the signal-dependent information considering the joint computing power such that a sum of encoding complexities of the encoding means does not exceed a value depending on the joint computing power. The encoding means $11_1$-$11_p$ encodes the respective information signal into a respective encoded information signal using the set encoding parameter signalized to the encoding means $11_1$-$11_p$ from the setting means 16 using a signal 18.

The means 16 for setting and the plurality of encoding means $11_1$-$11_p$ cooperate such that, with regard to subsequent time intervals, a distribution of the joint computing power depends on the encoding parameters or an encoding complexity of the individual encoding means. In other words, it is possible that the means 16 not only sets the encoding parameters of the individual encoding means $11_1$-$11_p$ but also at the same time determines the distribution of the joint computing power and indicates this distribution to the common platform (not shown) on which the encoding means $11_1$-$11_p$ are implemented. In this respect, for example, the setting means 16, by means of a lookup table, encoding means $11_1$-$11_p$ whose encoding parameter is set to a "complex" value and thus describes a complex encoding, might allocate a higher portion of the joint computing power, like, e.g., a higher temporal percentage of a processor power, and such with less complex parameter values. This direct computing power distribution may then be signalized to the encoding means $11_1$-$11_p$ or the common computing platform via the signal 18. The following examples assume, however, that the computing power distribution of the encoding parameter setting and/or the actual encoding complexity of the individual encoding means $11_1$-$11_p$ results from the fact that the encoding means $11_1$-$11_p$ encode a segment of the same temporal length of the respective information signal with a set of set encoding parameters, and thus encoding means, which are done sooner because their encoding parameter was less complex, wait till the next segment to be encoded.

As mentioned above, the encoding means $11_1$-$11_p$ may be controlled via the encoding parameters $X_1$-$X_p$ with regard to their encoding complexity/encoding distortion performance and/or behavior. In order to illustrate this, it is to be mentioned that, for example, an encoding complexity reduction results when an encoding means in the encoding of the respective information signal, due to an encoding parameter change, changes from a motion-compensated prediction to an intra-encoding. Due to this the encoding complexity decreases.

It is possible that the setting means 16 indicates the encoding parameters not directly by a signal, but indirectly by a signal which, so to speak, serves as a pointer and indicates the encoding complexity to be used for the individual encoding means. Depending on the signal change, the individual encoding means then maintain the encoding parameter in the encoding of the respective information signal or change the encoding parameter to execute an encoding complexity change in the way indicated at the output 18 in the predetermined way. The processing platform underlying the encoding means might, in this case, be implemented to use the signal at the output 18 to execute the distribution of the available overall computing power in a way which corresponds to the distribution of the individual encoding complexities allocated to the encoding means. According to the next embodiments, the distribution is exemplarily achieved by the common time raster within which the encoding means encode the segment of their respective information signal.

On the other hand, the signal 18 of the setting means 16 might also merely predetermine the computing power distribution, wherein the encoding means $11_1$-$11_p$ then for example receive their respective encoding parameter value via corresponding tables, wherein the value corresponds to the predetermined computing power with respect to its caused encoding complexity.

In the following embodiments, the signal 18 shows a distribution of the joint available computing power by the fact that the signal 18 predetermines the encoding parameter setting to be used for each encoding means such that encoding means which ought to obtain a high portion of the computing power are given an encoding parameter setting which corresponds to a high encoding complexity and vice versa. As an alternative to the following description, the processing platform underlying the individual encoding means may be implemented to derive its distribution of the overall computing power on the basis of the encoding parameter settings for the individual encoding means at the output 18. As a further alternative, a means, which is, for example, also implemented on the processing platform, observes how long, using the just predetermined encoding parameters, a respective encoding means takes for encoding a respective time segment of the respective information signal and accordingly readjusts the computing power distribution to enable the encoding of the time segments of its respective information signal for the respective encoding means in the time period of the time segments and/or in real time.

The above-described embodiment caused the encoding complexity for each encoding means to change proportionally to an available computing power portion. Here, the setting means 16 in principle sets the distribution such that an optimum ratio between the available computing power and the overall distortion results.

The type of signal-dependent information 14 may also vary. The signal-dependent information 14 which depends on all information signals to be encoded may, for example, be provided by especially provided information collectors with one information collector per information signal or, as in the case of the embodiments described in the following, in part by the plurality of encoding means for encoding the plurality of information signals. Here, the information signal-dependent information 14 gives information whether it is advantageous, with regard to the overall distortion, to change from an existing computing power distribution and/or a current computing power distribution to another distribution, i.e. whether an overall distortion reduction and/or improved overall distortion minimization may be obtained by this. In FIG. 2, for example, information collectors $12_1$-$12_p$ are shown which determine the quality distortion resulting from the encoding by means of the predetermined encoding parameters either from the encoded information signals (solid in-going arrows) or from reconstructions of already encoded time sections and/or frames of the information signals (dashed in-going arrows). Further collectors (not shown) may indicate the number of instruction cycles needed for a certain time segment which indicate the needed encoding complexity. Again, further collectors (not shown) may indicate the bit amount of the part of the encoded information signal corresponding to this time segment resulting for a predetermined time segment, which indicate the needed encoding rate or amount. As will be described in more detail with reference to the following embodiments, it is possible to have the encoding means $11_1$-$11_p$, each intermittently with regard to the encoding complexity, try out more complex and less complex encoding parameter settings to evaluate the encoding complexity change and encoding distortion change resulting from this trying out as part of the signal-dependent information 14, wherein the evaluation is finally executed by the distribution means 16.

It would also be possible, however, for an especially provided evaluation routine in a data collector to analyze the original information signal to conclude the encoding complexity of the respective information signal in general based on the information content of the signal itself, and, using predetermined ratio values under predetermined encoding parameter settings, also conclude the encoding complexity of individual different encoding parameter settings in the individual information signal in particular. Thus, for example, such a data collector—which is shown exemplarily for the $P^{th}$ information signal in FIG. 2 in dashed lines—might examine a program to be encoded in order to determine whether it is a video sequence which is complex to be encoded with many portions of movement, as, for example, in a football transmission, or a video scene with a static content, such as, e.g., a scene with a news reader in a news program. In contrast to probing out encoding parameter settings other than the current encoding parameter settings, it is possible in this alternative to execute the computing power distribution by the distribution means 16 not based on the signal-dependent information 14 obtained in the past, but based on the current, signal-dependent information.

In the following, with reference to FIGS. 3-6, embodiments are described in which, as indicated above, the situation-dependent information, based on which the computing power distribution is executed, are determined by intermittently "changing" the current encoding parameters to encoding parameter settings which are more and/or less complex with regard to the encoding complexity, in contrast to providing an analysis of these information signals taking place in parallel to the actual encoding of the respective information signals in order to extract signal-dependent information which allow conclusions as to the encoding complexity and/or correlate them. Before the following description of the figures, this idea is to be explained in a few introductory words. In particular, the above outlined probing out and/or sounding out is provided to address the fact that a complete set of data for $D(C,p,s)$ first of all is not available for the purpose of distortion optimization and/or computing power distribution for reasons of complexity. Of course it would be possible to encode every segment and program with several optimization levels and/or encoding complexity levels. This would, however, necessitate more complexity than is subsequently needed for the actual encoding. Instead, the following embodiments achieve an estimation of this data during encoding of the plurality of information signals and/or programs to be encoded without too much effort. As an example from video encoding, B frames for example comprise a better RD performance than P frames, wherein the same are, however, also more complex to encode. In the following, according to the following embodiment, the estimation is executed, for example, by encoding B frames with a predetermined interval in every program to be able to estimate the gain which results from this with regard to the encoding distortion relative to the complexity increase, i.e. the ratio $dD/dC$. Extra-B frames may then, for example, be introduced into the program which profits most from the additional processing power. A further possibility would be to use a higher optimization level for a certain program for a certain percentage of the frames, in order, e.g., to see what the effect of multi-reference frames is, as it is, for example, possible in the standard H.264/AVC. The estimation of $D(C,p,s)$ according to the following embodiments now thus includes "testing" or "probing out" the processing platform on which the encoding means are implemented with increased optimization levels or more complex encoding tools, like, e.g., the above-mentioned B frames. For this reason, the processing power is at least sometimes above an otherwise existing average power level. In the case of a single encoder, this increased complexity under strict real-time conditions would lead to serious problems, as the currently encoded frame would leave the encoder too late and, for example, would miss its predetermined transmission time, while still being encoded. When encoding several programs on one single processing platform, as is the case in the preceding embodiment and the following embodiment, the additional load which results from the "probing out" may be balanced and/or distributed among the programs such that only one of the programs, for example, has a higher complexity for the process of probing out, while all the other programs comprise the average complexity.

To illustrate this, it is, for example, assumed that B frames need double the complexity of P frames. It follows that, if only one of the P programs encodes a B frame at any point in time, the processing load compared to the encoding of only P frames is only increased by $P+1/P$. Consequently, encoding B frames with a repetition time period of P time units and/or time segments in each program increases the overall complexity only slightly, while probing out the processing platform and estimating $dD/dC$ enables an optimized distribution of the overall complexity.

Variations of the optimization level and/or the encoding parameter setting may here also be executed on a finer or coarser granularity level than frames, such as, e.g., on a slice level, deviating from the examples provided so far and in the following.

In addition, in preparation for the following description, another aspect of the following embodiments is to be underlined which deals with the real-time secondary condition. As already discussed briefly above, the information signals are to be encoded fast enough, so that they may be encoded in real time and/or the encoded data streams may be output in real time. In other words, the information signals to be encoded are, for example, divided into time segments, such as, e.g., frames and/or images, in the case of video signals and frames in the case of audio signals, and, according to a strict real-time condition, the encoding of the several information signals for each information signal within each of those time segments would have to be fast enough to execute the encoding of the corresponding segment within the time period of the corresponding segment. This strict real-time condition is loosened in the following embodiments, i.e. by providing input-side intermediate storages. By this loosening of the real-time condition, also the estimation of $D(C,p,s)$ is further simplified, as it is possible in this case to buffer several non-encoded frames even before encoding and/or even before the respective encoding means, for example in an FIFO way (first in first out). The uncompressed raw frames may be input into the FIFOs with a predetermined frame rate, such as, e.g., 25 Hz, like in the case of a video encoding, wherein the corresponding encoding means takes the frames from the corresponding FIFO during encoding. Thus, if the encoding means needs more encoding effort than expected in a current frame, the memory content in the intermediate storage and/or FIFO will grow. Then, the encoding means is able, however, by a reduction of the optimization level and/or a reduction of the complexity of the encoding to encode some of the following frames faster, in order to reduce the memory amount in the FIFO in this way and thus again "make up time". Consequently, the following embodiments, by providing a FIFO for raw frames before the respective encoding means, enable additional flexibility with regard to the load distribution and/or computing power distribution over time. By this additional flexibility, an additional advantage with regard to the overall distortion optimization may result. In some applications, the introduced additional delay may be well accepted by providing the FIFO, e.g. when the transmission scheme for a subsequent transmission of the multiplexed encoding stream from the encoded information signal introduces a delay anyway, as it is, for example, the case with the time multiplex operation by means of the time slots in a DVB-H transmission.

Figure 3:
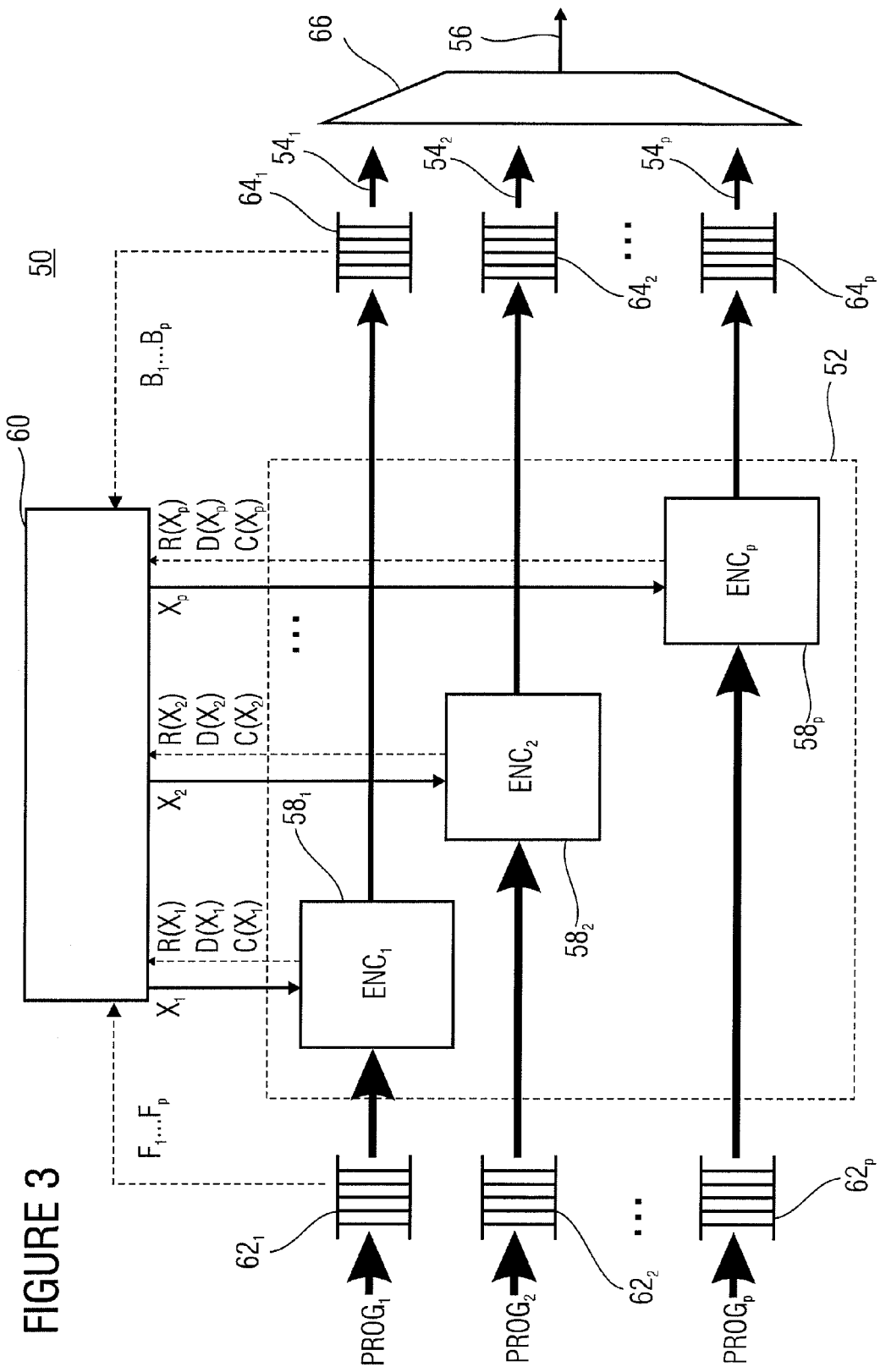
FIG. 3 shows a block diagram of a system for encoding and transmitting a plurality of information signals according to an embodiment of the present invention.

In the following, first of all reference is made to FIG. 3. FIG. 3 shows a system 50 for encoding a plurality of information signals and/or programs using a joint computing power made available by a processing platform 52 and here exemplarily for a subsequent change of the resulting encoded information signals into a joint multiplexed information signal for a transmission on a common transmission channel, such as, e.g., by means of DVB-H.

The system 50 is in particular provided to encode a plurality of P programs with $P>1$ $PROG_P$ with $p=1, P$, and to convert the resulting encoded information signals $54_1$-$54_P$ into a common encoded data stream 56. In this respect, the system 50 includes P encoding means $58_1$ to $58_P$ and/or $ENC_1$ to $ENC_P$, which are implemented on the processing platform 52, e.g. as software programs which may run on the platform 52, and a controller 60 for controlling the plurality of encoding means $58_1$-$58_P$, which in so far represents a special implementation for the embodiment of FIG. 2. Further, the system 50 includes in each case an intermediate storage $62_1$ to $62_P$ on the input side upstream from an input of the respective encoding means $58_1$-$58_P$ for each encoding means $58_1$-$58_P$ and, for each encoding means $58_1$-$58_P$, an intermediate storage $64_1$-$64_P$ on the output side downstream from an output of a respective encoding means $58_1$-$58_P$, and a multiplexer 66 which here exemplarily executes a time multiplexing of the encoded information signals $54_1$-$54_P$ provided at an output of the output-side intermediate storage $64_1$-$64_P$ and is in this respect connected to the outputs of these intermediate storages $64_1$-$64_P$ on the input side to output a multiplexed joint encoding data stream 56 at its output. Here, it is now to be noted that the further processing of the encoded information signals $54_1$-$54_P$ by the multiplexer 66 only serves for illustration purposes, and, of course, also other processing possibilities exist.

The controller 60 is coupled to each of the encoding means $58_1$-$58_P$ to be able to prescribe and/or predetermine for each encoding means $58_1$-$58_P$ the use of a certain encoding parameter set $X_1$-$X_p$, and to obtain from each encoding means $58_1$-$58_P$ as signal-dependent information current values of an encoding rate resulting using the predetermined encoding parameter set $X_1$-$X_p$, i.e. $R(X_p)$, encoding distortion, i.e. $D(X_p)$ and complexity, i.e. $C(X_p)$, wherein in FIG. 3 it is assumed that in this respect in the encoding means corresponding data collectors (not illustrated in FIG. 3, but cf. FIG. 2) are located in the same which determine the information. In addition to this, each intermediate storage $62_1$-$62_p$ and $64_1$-$64_p$ is coupled to the controller 60 to be able to signalize to the same by means of a corresponding filling state signal that the corresponding intermediate storage tends to either become full and/or empty, e.g. has exceeded a certain filling degree, or even to be able to inform on the filling degree as such.

Now that the setup of the system 50 has been described above, the functioning of the same will be described additionally in the following with reference to FIGS. 4-6.

The several programs $PROG_1$-$PROG_P$ reach a respective one of the encoding means by which they are encoded and/or compressed via the respective intermediate storages $62_1$-$62_P$ where they are buffered. Here, the encoding means $58_1$-$58_P$ are implemented on the processing platform 52 as mentioned above, which enables dynamically distributing the processing power made available by the same among the encoding means $58_1$-$58_P$, as it is possible by the selection of $X_1$-$X_P$ by the controller 60. For example, the encoding means $58_1$-$58_P$ are implemented as a respective software program, and the platform 60 allocates a different and time-variable operation mode to the same according to the preconditions $X_1$-$X_P$, which results in more or less instruction cycles being used. If less instruction cycles are needed, the corresponding coding means is done even before the end of a time segment and waits until the next time segment begins, so that in the remaining time of the current time segment the other encoding means do not have to share the computing power with this encoding means any more, etc.

The controller 60 now deals with the joint encoding of the programs $PROG_1$-$PROG_P$, by setting, for example for each encoding means $58_1$-$58_P$, the encoding parameters to be used and/or the encoding parameter set to be used, i.e. the parameter set $X_1$ for the encoding means $58_1$, the encoding parameter set $X_2$ for the encoding means $58_2$, etc. The encoding parameters may be changed dynamically over time, such as, e.g., in units of or between time segments. To stay with the current example of video encoding, the encoding parameters may, for example, set a quantization step width Q to be used in encoding, a frame type to be used, e.g. an intra-, or I-, a predictive, or P, or a bi-predictive, or B frame, a maximal search range in motion estimation for detecting associated image portions in a current image and a reference image, a number of reference frames to be used to be searched for motion estimation, a mode decision algorithm, e.g. a number of macro block or transformation block modes that may be selected in encoding, a search depth for the mode decision, etc. The encoding means in this respect are, for example, hybrid video encoders for encoding by means of motion-compensated prediction and, for example, transformation-based and/or lossy residual signal encoding, i.e. encoding the remainder regarding the reconstruction of a motion-compensated frame.

The decision as to what encoding parameters $X_1$-$X_P$ are predetermined for the encoding means $58_1$-$58_P$ depends on the information that may be evaluated in the way described in the following, i.e. in particular the information signal-dependent information $R(X_P)$, $C(X_P)$ and $D(X_P)$, and on the filling state information of the intermediate storages $62_1$-$62_P$ and $64_1$-$64_P$.

If one of the encoding means $58_p$ with $0 < p \leq P$ is controlled with a certain encoding parameter set $X_P$, due to the current constitution of the corresponding information signal to be encoded and/or the program $PROG_P$, a certain encoding complexity $C(X_P)$, bit rate $R(X_P)$ and a distortion $D(X_P)$ caused by the encoding results therefrom, wherein these values are thus signal-dependent and change over time and are provided to the controller 60 as signal-dependent information as mentioned above.

The controller 60 now, for example, tries to set the encoding parameters $X_1$-$X_P$ for the encoding means $58_1$-$58_P$ to the respectively optimal encoding parameter sets as far as this is possible with regard to the computing power provided by the platform 52. Usually, however, it lacks information $D(C,p,s)$ for the respective program p and the current segment s. In the following, a lack of this information is assumed. Thus, according to the present embodiment, the controller 60 tests the possibility of an improvement of the overall distortion caused by the encoding of the programs $PROG_1$-$PROG_P$ within the same by controlling for each time segment one encoding means $58_1$-$58_P$ each with another encoding parameter set which either lets you expect a higher complexity or a lower complexity than the encoding parameter set which was currently used and/or would currently have been used to obtain a minimal overall distortion according to a predetermined optimization rule. In this way, the controller 60 tests the encoding situation at the individual encoding means $58_1$-$58_P$ in termittently to determine whether it is worthwhile to deviate from the current encoding parameter sets and to select another encoding complexity distribution and accordingly another computing power distribution.

In order to illustrate this, in the following reference is made to FIGS. 5a-5c. FIGS. 5a-5c exemplarily show for three programs the division of the same into time segments 80. The time segments 80 are illustrated as boxes, wherein the boxes 80 are each illustrated arranged horizontally next to each other in a time axis direction 82 for a respective program $PROG_1$-$PROG_3$. Among the temporally subsequent time segments 80 of a respective program, as is illustrated, there are also ones in which a "+" or a "−" sign is plotted, and also ones in which no sign is provided and which are empty. The different time segments 80 in FIGS. 5a-5c are to show here whether the underlying encoding parameter set X for encoding the corresponding time segment 80 predetermined by the controller 60 serves for probing out the encoding situation of the corresponding program or not. In particular, time segments 80 with a "plus" sign represent time segments for which the controller 60 of the corresponding encoding means predetermines an encoding parameter set which serves for testing an encoding that is more complex with regard to the encoding complexity than the encoding leading to the optimized overall distortion, while time segments 80 with a "−" sign are to refer to time segments for the encoding of which the controller 60 of the corresponding encoding means predetermines an encoding parameter set so that a less complex encoding with regard to the encoding complexity is tested out. The remaining time segments 80 without an indicated plus/minus sign represent time segments for the encoding of which the controller 60 predetermines an encoding parameter set for the corresponding encoding means which corresponds to the currently determined optimized complexity and/or computing power distribution.

Before now, with reference to FIGS. 5a-5c, different examples of testing the encoding situations of the programs by the controller 60 are discussed, it is noted that in these figures the time segments 80 of the programs are only exemplarily temporally arranged such that the time segments 80 are arranged synchronously to each other. This is not compulsory, however. It is further not needed that the time segments of each program comprise a constant length or are the same among the programs. In the current case, however, for simplifying the understanding, such a configuration was assumed, which is why in the following the expression time segment is used in a temporal sense, i.e. in the sense of a time section along the time axis 82 in which one time segment 80 each of the respective programs is located.

In this way, FIG. 5a now shows an example for testing out the encoding situation of the different programs, according to which, within each program having a fixed time interval length, alternatingly more and less complex encoding parameter sets are tested out with regard to the encoding complexity. The time interval length is here exemplarily 2*P and/or in the current case 2*3=6 time segments, wherein the intermittent testing out in the programs takes place such that for each time segment only one of the programs is tested.

Also in the embodiment of FIG. 5b, at every point in time only the program situation on one of the programs is tested. Further, within each program again testing out takes place alternatingly, i.e. one time with an encoding parameter set for a more complex encoding and the other time with an encoding parameter set for a less complex encoding. However, in the example of FIG. 5b, the intervals between the testing time segments are not constant. Rather, in the example of FIG. 5b, the controller 60 causes those programs to be tested out more frequently for which it is expected with a higher probability that a change to a more complex or less complex encoding would be worthwhile.

In the example of FIG. 5c also only one program per point in time and/or time segment is tested out. Also the intervals of testing within a program are constant as in the case of FIG. 5a. However, in FIG. 5c the pattern of testing out of a more complex and less complex encoding does not take place alternatingly as in the case of 5a, but asymmetrically, that is in the case of FIG. 5c exemplarily such that a more complex encoding is tested out twice as often as a less complex one.

It is to be noted that the examples of FIGS. 5a-5c merely represent a non-exhaustive listing of possibilities as to how a testing of the encoding situation may be executed on $PROG_1$-$PROG_P$. As is explained in the following, it is also possible by corresponding measures to only probe out more complex encoding parameters sets.

At any rate, the controller 60 receives signal-dependent information by probing out which it may use to decide whether it is worthwhile to leave a current encoding parameter setting for the individual encoding means $58_1$-$58_P$ or not. To illustrate this, reference is made, for example, to FIG. 4. FIG. 4 shows an example for the signal-dependent information which the controller 60 from the RDC values of the encoding means $58_1$-$58_P$ here exemplarily uses for P=3 in order to decide whether a change from a current encoding parameter setting for a respective encoding means to another encoding parameter set is worthwhile or not. In particular, FIG. 4 shows a three-dimensional graph for each of the three programs exemplarily shown here, along the axis of which C, R and D are plotted, wherein the origin of the coordinate system lies at ($C_{current}$, $R_{current}$ and $D_{current}$) In other words, the origin of each graph of the respective one of the three programs exemplarily shown in FIG. 4 lies at the RDC point which in the last time segment of the corresponding program resulted in a non-test situation (in a time segment 80 without a plus/minus sign in FIGS. 5a-5c). The complexity $C_{current}$ for the individual programs was determined hitherto by the controller 60 as an optimal distribution of the complexity and thus of the computing power. In every graph now further RDC points are plotted which in FIG. 4 exemplarily either have the component $R_{current}$ or the component $C_{current}$ in common with the coordinate origin. The RDC points with R=$R_{current}$ were obtained by the respective encoding means in the last time segments 80 in which lastly another encoding parameter set was used than was present for ($C_{current}$, $R_{current}$ and $D_{current}$), i.e. a parameter in an encoding parameter set which leads to an increased complexity, i.e. $C_{current+1}$ (box with "plus" sign in FIGS. 5a-c) and the other time with an encoding parameter set which leads to a lower encoding complexity, i.e. $C_{current-1}$ (box with a "minus" sign in FIGS. 5a-5c). The other two points in the respective graph are received by the encoding means 60 according to the present embodiment in every time segment 80 by the fact that exemplarily the encoding means $58_1$-$58_P$ are implemented to also test different encoding rates for an optimal encoding of the respective program, to execute an RD optimization. In FIG. 4, consequently the two points with C=$C_{current}$ correspond to RDC tuples which did, in fact, not result in an encoding of the information signals and/or programs $PROG_1$-$PROG_P$, whose encoding result was used for the encoded information signals and/or encoded programs $54_1$-$54_P$. Alternatively, it would, of course be possible to determine also these points by actually testing out, as was described with reference to FIGS. 5a-5c for a complexity change.

Based on the four points or supporting points, respectively, for each of the programs, the controller 60 may now decide whether it is worthwhile in a current situation to change the encoding parameter settings of the individual programs, which may be the case when the distortion reduction ΔD by a corresponding complexity increase ΔC or rate increase ΔR is more significant than the resulting distortion increase ΔD which results when the corresponding encoding complexity ΔC and/or encoding rate ΔR is reduced in one of the other programs.

Figure 4:
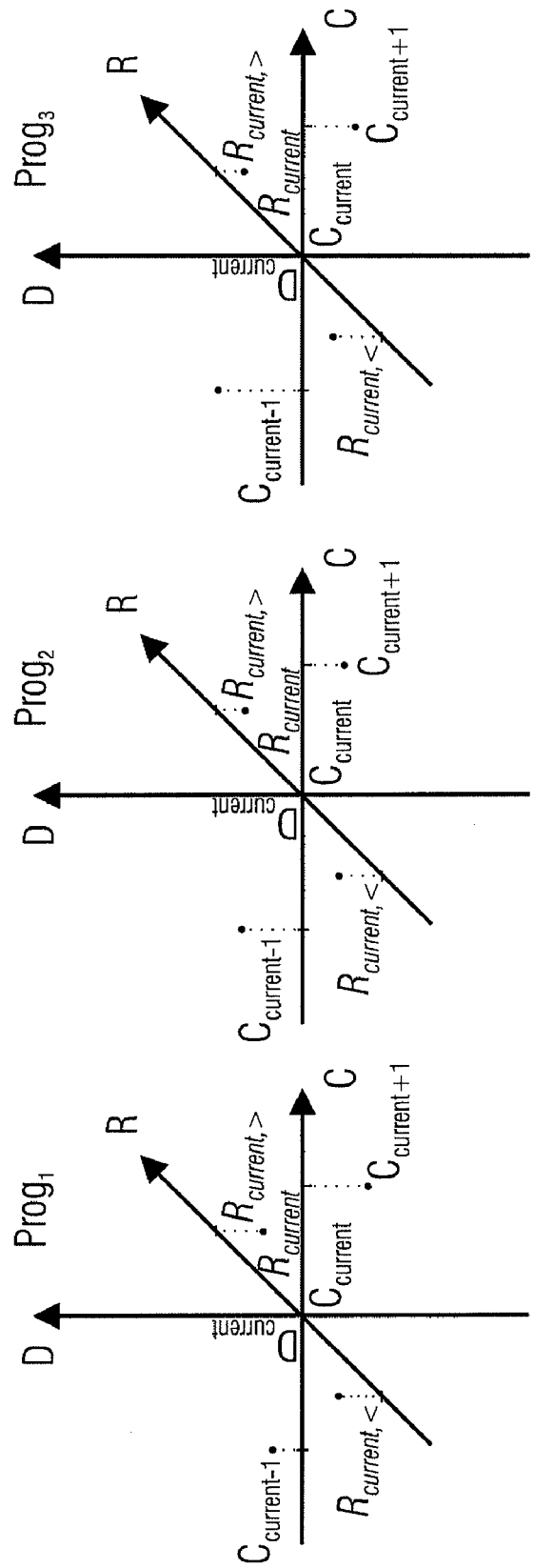
FIG. 4 shows a schematical illustration for illustrating an example for signal-dependent information which the controller in FIG. 3 uses for code rate and encoding complexity distribution.
Figure 5:
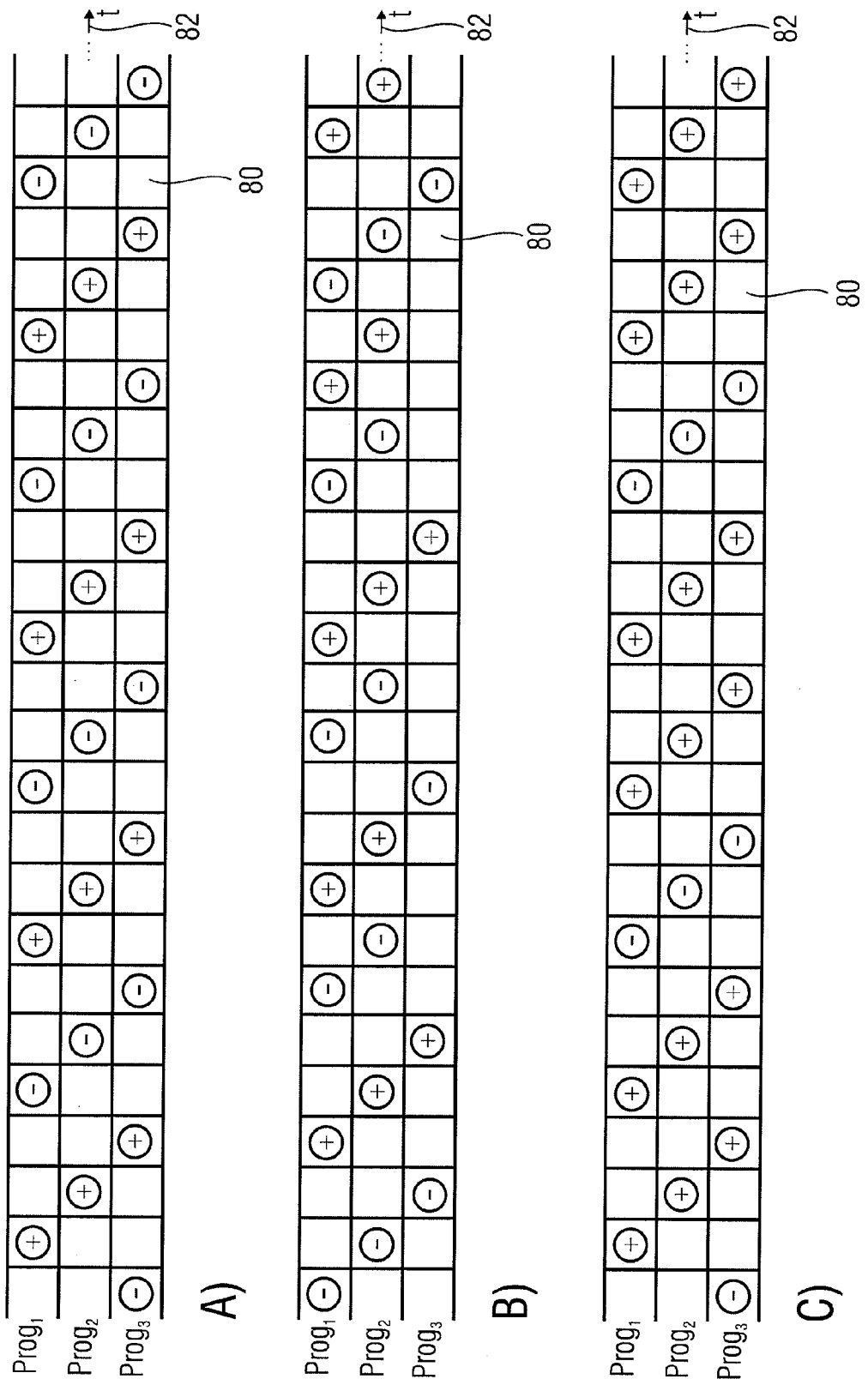
FIG. 5a to 5c show schematical illustrations for illustrating different examples for a time-discrete probing out of the encoding situations of the individual information signal encodings.

With reference to FIG. 4 it is noted that also here the illustration of FIG. 4 only serves for illustrating purposes. While FIG. 4 shows that the controller 60 used four encoding parameter settings different to the current one for each program and/or the associated resulting RDC tuples, to determine for the next time segment the optimal encoding parameter setting and thus also the distribution of the coding complexity among the programs, the number may also be a different one. Additionally, the embodiment of FIG. 4 is simplified in so far that in FIG. 4 it was assumed that the alternative encoding parameter settings of the four RDC supporting points which lie outside the origin are only different from the origin regarding two of the three coordinates. ++This does not have to be the case either. It is, for example, possible that every encoding parameter set $X_p$ includes a set of encoding parameters $x_i$, i.e. $\{x_1, \ldots, x_n\}$, wherein each parameter $x_i$ is an element of a respective quantity $X^i$ of possible encoding parameters, i.e. $X_p \in \{X^0, X^1, X^2, \ldots, X^N\}$. From this, possible encoding parameter settings $X(j)$ result with $0 < j \leq z$ from the quantity M of encoding parameter sets $\{X(1), \ldots, X(z)\} \in \{X^0, X^1, X^2, \ldots, X^N\}$, which may be set into an order, so that the encoding complexity for $X(r)$ with $r \in \{1, \ldots, z-1\}$ is smaller than for $X(r+1)$. Within such a quantity M, the controller 60 then selects, for example, the encoding parameter setting to be used for the respective encoding means, so that, based on a current encoding parameter setting $X(m)$, the encoding parameter setting for one of the encoding situation tests is set to the encoding parameter setting $X(m-1)$ for a lower encoding complexity and $X(m+1)$ for a higher encoding complexity.

The hitherto described functioning of the controller 60 of the system 50 will now be explained in more detail with reference to FIG. 6. According to FIG. 6, the controller 60 for optimizing the joint encoding includes an optimization means 72 which decides, based on the RDC tuples from the encoding means $58_1$-$58_P$, whether a better overall distortion is possible by a change to other encoding parameter settings. In other words, the optimization means 72 executes an optimization of the encoding parameters on the basis of the RDC values. In particular, it selects among the available possibilities for combinations of P RDC tuples, i.e. one for each encoding means p ($0 < p \leq P$) which belong to the different encoding parameter formations of the encoding parameters $X_1$-$X_P$, that one which leads to a minimal overall distortion, such as, e.g., a minimal sum of the individual distortions $D_1 + \ldots + D_P$, while maintaining the side conditions that the maximal overall rate $R_{max}$ available for transmission is not exceeded by the sum of the corresponding individual rates $R_1 + \ldots + R_P$ and the overall complexity $C_{max}$ that may maximally be worked in the time of a time segment based on the available joint computing complexity is not exceeded by the sum of the individual complexities $C_1 + C_P$. The side conditions with the parameters $R_{max}$ and $C_{max}$ are loosened somewhat based on the input- and output-side buffers, as is described in the following. In other words, the control means 60 serves for setting the encoding parameters X such that the desired computing power distribution results.

It is, for example, assumed, that the currently used encoding parameter setting for the encoding means $58_1$-$58_P$ which applied for the last time segment is given by $\{X_1 = X(a_1), X_2 = X(a_2), \ldots, X_P = X(a_P)\}$ with $a_1 \ldots a_P \in \{1 \ldots z\}$. For all these encoding settings the means 72 is informed about a corresponding RDC tuple. Further, the means 72 per program p received one RDC tuple each for one or several test encoding parameter settings $X_P = X(b_P)$ with $b_P \neq a_P$. Then, means 72 of the controller 60 tests which of the possible combinations of encoding parameter settings for the individual programs p under the current $X(a_p)$ and the one and/or several alternative $X(b_p)$ leads to a lower and/or minimized overall distortion, e.g. to a minimization of the sum of the Ds of the corresponding RDC tuples. Here, the means 72 will consider the side condition that the capacities C of these RDC tuples in summation may not exceed the overall power of the platform 52. As will be explained in more detail, maintaining the side condition may, however, be temporarily loosened by the use of intermediate buffers. In addition to that, the means 72 may consider a further side condition which is that the sum of the R values should not exceed a maximum overall encoding rate which is determined by the transmission channel, via which the common encoded signal 56 is to be transmitted, i.e. either additionally or alternatively to the side condition that the sum of the complexity values C may not be greater than the complexity which can be processed by the joint computing power of the platform 52 within the time period of one time segment.

The optimization process executed by the means 72 may lead to a change of one or individual ones of the current encoding parameter settings $X(a_p)$ into a respective one of the text encoding parameter settings $X(b_p)$. This change may mean an encoding complexity increase or decrease as compared to the current encoding complexity of the current encoding parameter setting $X(a_p)$.

Figure 6:
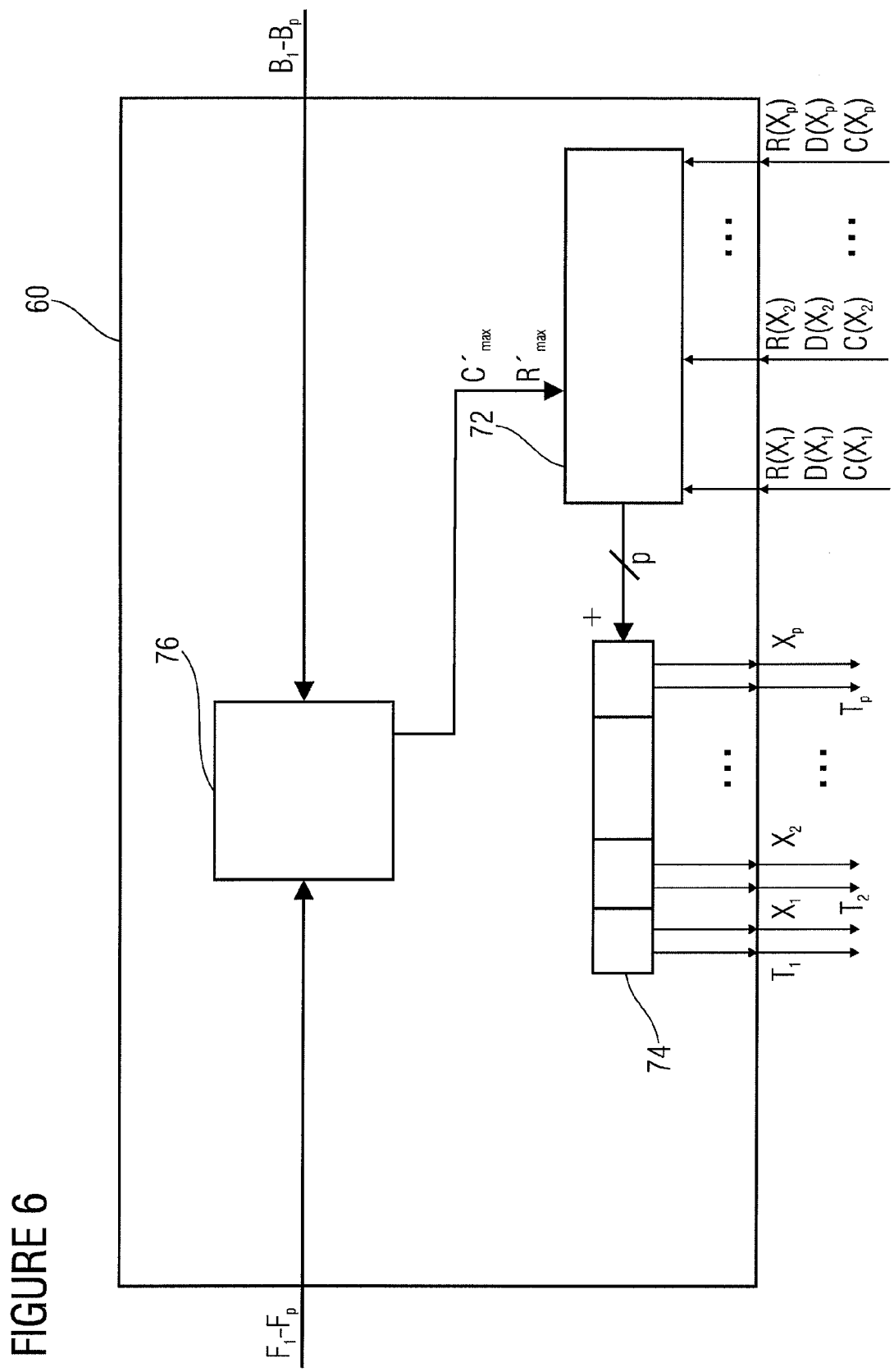
FIG. 6 shows a more detailed functional block diagram of the controller of FIG. 3 according to an embodiment of the present invention.

In FIG. 6 it is indicated, for example, that the optimizing means 72 changes a register 74 of the controller 60 accordingly in which in each case the current encoding parameter settings $X(a_p)$ for the individual encoding means $58_1$-$58_p$ are held. For example, the means 72 controls the register 74 in order to change $X(a_p)$ to $X(b_p)$.

Now, as indicated above, before and after each encoding means $58_1$-$58_p$ frame intermediate storages $62_1$-$62_p$ and/or bit intermediate storages $64_1$-$64_p$ are provided to absorb deviations in complexity and/or bit rate which are, for example, caused by the fact that the optimization means 72 executes the optimization considering the above explained side conditions, but on the basis of past RDC tuples, i.e. estimates for the current, actual RDC tuples. If, after the actual encoding, the RDC values deviate from the estimated RDC values, the deviation may be absorbed in the buffer and be corrected by a locked loop in the next optimization step.

For this function, the controller 60 according to FIG. 6 comprises a corresponding measure means 76 which comprises, for example, access to the filling degrees $F_1$-$F_p$ of the frame intermediate storages $62_1$-$62_p$. The measure means 76 uses the level values $F_1$-$F_p$ for a control and/or variation of the maximum values $R_{max}$ and $C_{max}$ from these strict values to values $R'_{max}$ and $C'_{max}$ varying around these strict values. For example, it provides for maintaining a certain maximum overall target complexity C and thus the above real-time condition by influencing the optimization means 72 when the frame intermediate storage 62 of a certain encoding means grows too much and thus runs the risk of becoming full, that the complexity side condition is tightened in the next optimization step, i.e. by reducing $C'_{max}$. In the optimization with an adapted side condition, then a new parameter set $X(a')$ results with a lower complexity, i.e. $a'_p < a_p$.

Even if the controller 72 results in an encoding which does not strictly stick to the rate side conditions and/or complexity side condition, the measure means 76 counteracts this overload by seemingly reducing the overall available complexity $C'_{max}$ and/or bit rate $R'_{max}$. In this case, optimization means 72 and measure means 76 complement one another in so far as the measure means 76 sees to it that the optimizations by the optimization means 72 do not lead to an overload.

In a similar way, the measure means 76 uses filling degrees $B_1$-$B_p$ which are signalized from the bit intermediate storage $64_1$-$64_p$ to the measure means 76. The measure means 76 then uses the same for a rate control and/or rate correction, i.e. to manage maintaining a certain target bit rate $R_{max}$ with which the multiplexed total signal 56 is transmitted, whereby a bit rate condition is maintained. If the filling degree of the bit intermediate storage $64_1$-$64_p$ grows too much, the measure means 76 sees to it that the rate side condition in the form of $R_{max}$ is seemingly reduced, i.e., for example, changed from $R_{max}$ to $R'_{max} < R_{max}$. The optimization under the adapted side condition $R'_{max}$ then leads to the selection of encoding parameters with a reduced bit rate R(x), e.g. by changing to another encoding parameter set, in which the quantization step width Q is increased relative to the current encoding parameter set. Encoding means which comprise a bit rate which is too low due to such a selection by the optimization means 72 then receive a changed encoding parameter set due to the measure means 76 in order to counteract the encoding rate which is too low which is responsible for the fact that the corresponding bit intermediate storage becomes too full.

In other words, the measure means 76 is used for regulating the marginal condition. I.e., when, for example, the actually available computing power is Cmax and due to an estimation error and/or an inaccuracy of the controller the actually resulting complexity in one operating step is C=C(X1)+C(X2)+ . . . +C(XP)=Cmax−dC, i.e. when the marginal condition is exceeded or fallen short of by dC, then in the next operating step an adjusted marginal condition Cmax'=Cmax−dC may be used. I.e., the measure means "feigns" a marginal condition reduced by the error to the optimization means. Thus, the marginal condition is regulated via several steps and is maintained on average. The measure means 76 in particular deals with the complexity control and the rate control. The complexity control is insensible for the fact to what encoding means the intermediate storage which indicates the extreme filling level is associated. Rather, the total deviation across all encoding means (dC=$C_{max}$−C(X1)−C(X2)− . . . −C(XP) or dR=Rmax−R(X1)−R(X2)− . . . −R(XP)) is considered and the adjusted marginal condition is in the next step again applied to all encoding means. Similar things apply to rate control.

In summary, in the embodiment of FIGS. 3-6, the controller 60 provides an optimized computing power distribution among the encoding means by estimating the CD compromises in every program based on the observations in the past. The controller 60 may use the opportunity of controlling the total load by probing out what effect it has to change the current encoding parameters to changed encoding parameters X' in only one partial set of the encoders at a given point in time. In this respect, as mentioned above, it selects, for example, a more complex B frame encoding in one of the encoding means, while P frames are used in all the other encoding means. For the encoding of the next frame, a different encoding means is then selected to encode a B frame, etc. Based on the observed CD compromises, the controller 60, as mentioned above, allocates the processing power of every encoding means such that the total distortion is minimized, while the total complexity remains below a certain target threshold C. The allocated complexity is realized by selecting suitable encoding parameters X, i.e. using the above-described complexity control. Based on observed RD compromises, the controller 60 may further allocate a bit rate to every encoding means such that the total distortion is minimized while the total bit rate is held below a certain target threshold R. The allocated bit rate is obtained by selecting the suitable encoding parameters X, e.g. by a suitable selection of the quantization step width Q which is to be used by the encoding means, for example to encode a residual signal in the case of a hybrid encoding. This rate control then, in combination with the CD optimization, results in an efficiency increase exceeding a pure RD optimization.

The above embodiments are mainly based on the fact that the computing load was distributed among several encoding means in order to balance the load and optimize the total quality. In this respect, a load balance was used to distribute the work load of encoding means for example to several CPUs and/or several CPU cores. In the embodiment of FIGS. 3-6, here not only the bit rate was distributed to use a bit rate limitation of a capacity R in the best possible way, but the complexity was distributed among several encoding means to optimally use a processing platform of a capacity C. In this respect, by a combination of both dimensions a further gain was achieved. As described in the embodiment of FIG. 2, a CD optimization alone already offers a gain in the case, for example, of an encoding with a fixed bit rate.

With reference to the above embodiments it is still to be noted that the present invention is not limited to video encoding. Rather, the present invention may, for example, also be used in audio encoding for encoding several audio signals. Further, the present invention is not limited to cases in which a total bit rate has to be maintained. Rather, the present invention is also advantageous when the individual encoded information signals are used further individually. One advantage in the use in connection with DVB-H is, however, that here, due to the time multiplex and/or the duration of the time slots in which only one corresponding time section of the same is used for transmitting one of the programs, i.e. in so-called bursts, providing the bit intermediate storages $64_1$-$64_p$ in these applications does not cause a disadvantage, as such an intermediate storage has to be present anyway due to the time multiplex operation to collect the data from burst to burst and/or time frame to time frame.

With regard to the platform on which the encoding means are implemented, it is noted that reference was made above to a software implementation of these encoding means, but that in principle also an implementation in hardware is possible, wherein, for example, units processing the same encoding task are provided redundantly within the platform 52 and are distributed to different programs for processing the encoding task for processing the individual macro blocks within the images of the programs depending on the encoding complexity and/or computing power allocated to the individual encoding means.

It is still to be noted that, instead of an encoding parameter, also only one encoding parameter of an encoding means may be set. The same does not have to be the same for the individual encoding means. In addition, also the encoding means do not have to be identical. They may, rather, also be different. For setting the encoding parameters, the encoding complexities do not necessarily have to be measured as described in FIG. 3, as the signal dependency of the encoding complexity may, for example, be only low or not present at all depending on the encoding means type, so that the encoding complexity may be concluded merely from the encoding parameter setting. It is further to be noted that a "minimization" according to the present invention should also include a minimization which is linked to a side condition. With regard to the above embodiments, thus, apart from the two rate and complexity side conditions, also further ones may be provided. It is further to be noted that the sums of complexities, distortions and/or rates mentioned above in connection with the minimization of the encoding distortion and/or the maximization of the encoding quality, which may also be regarded as synonymous, may also be weighted sums. Instead of sums, also combinations of a more general type may be used, like, e.g., square sums, etc.

It is in particular to be noted that, depending on the circumstances, the inventive scheme may also be implemented in software. The implementation may be on a digital storage medium, in particular a floppy disc or a CD having electronically readable control signals which may cooperate with a programmable computer system such that the corresponding method is executed. In general, the invention thus also consists in a computer program product having a program code stored on a machine-readable carrier for executing the inventive method when the computer program product is executed on a computer. In other words, the invention may thus be realized as a computer program having a program code for executing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for encoding a plurality of information signals using a joint computing power, comprising:
a plurality of encoders for encoding a respectively different one of the information signals using the joint computing power, wherein each encoder is controllable via at least one respective encoding parameter with regard to its encoding complexity/encoding distortion performance;
a provider for providing information for each of the encoders which depends on the respective information signal and indicates an encoding distortion of the respective encoder; and
a setter for setting the encoding parameters depending on the signal-dependent information considering the joint computing power such that a sum of encoding complexities of the encoders does not exceed a value which depends on the joint computing power,
wherein the setter for setting and the plurality of encoders cooperate such that with regard to subsequent time intervals a distribution of the joint computing power depends on the encoding parameters or an encoding complexity of the individual encoders,
wherein at least one of the a plurality of encoders, the provider and the setter comprises a hardware implementation.

2. The device according to claim 1, wherein the provider for providing is implemented to provide, for each of the encoders, the signal-dependent information in allocation to a value of the respective encoding parameters.

3. The device according to claim 2, wherein the encoders are lossy encoders which are implemented to use a reconstruction of a frame, which already passed at least one lossy part of the encoding, of the respective information signal as a predictor for a frame of the respective information signal which is not yet encoded, and wherein the provider for providing is implemented to determine the signal-dependent information on the basis of the reconstruction and the respective information signal.

4. The device according to claim 2, wherein the setter for setting is implemented to execute the setting of the encoding parameters for each of the encoders depending on the signal-dependent information allocated to the different values of the respective encoding parameter.

5. The device according to claim 2, wherein the setter for setting is implemented to execute the setting of the encoding parameters after a predetermined algorithm such that a total distortion determined by a combination of the encoding distortion of the encoders associated to the set values of the encoding parameters is minimized considering the joint computing power.

6. The device according to claim 5, wherein the setter for setting is further implemented to consider a maximum total bit rate when setting the encoding parameters.

7. The device according to claim 5, wherein the provider for providing is implemented such that the signal-dependent information for each of the encoders in allocation with the encoding distortion also indicates the encoding complexity of the respective encoder.

8. The device according to claim 7, wherein the provider for providing is implemented such that the signal-dependent information indicates the encoding complexity of the respective encoder in units of instruction cycles.

9. The device according to claim 5, wherein the setter for setting is implemented such that a combination of the encoding complexities associated with the encoding distortions of the encoders associated with the set values of the encoding parameters does not exceed the value depending on the joint computing power.

10. The device according to claim 5, wherein the provider for providing is implemented such that the signal-dependent information for each of the encoders in allocation with the encoding distortion also indicates the encoding rate of the respective encoder.

11. The device according to claim 5, wherein the setter for setting is implemented such that a combination of the encoding rates allocated with the encoding distortions of the encoders allocated with the set values of the encoding parameters does not exceed a value indicating a maximum total bit rate.

12. The device according to claim 5, wherein the setter for setting is implemented to change, for each encoder, intermittently the respective encoding parameter deviating from a value indicated by the predetermined algorithm, to an alternative value different from the indicated value.

13. The device according to claim 12, wherein the setter for setting is implemented to execute the intermittent change such that at any point in time no more than the encoding parameter of a predetermined maximum real part of the plurality of encoders is set to a respective alternative value.

14. The device according to claim 1, further comprising a setter for setting the value which depends on the joint computing power.

15. The device according to claim 14, wherein the setter for setting the value which depends on the joint computing power is implemented to respond to a first intermediate storage filling state signal, which indicates that an intermediate storage upstream from one of the plurality of encoders tends to become full, by reducing the value which depends on the joint computing power.

16. The device according to claim 14, wherein the setter for setting the value which depends on the joint computing power is implemented to respond to a second intermediate storage filling state signal, which indicates that an intermediate storage downstream from one of the plurality of encoders tends to become full, by increasing the value which depends on the joint computing power.

17. The device according to claim 1, wherein the setter for setting is implemented such that the encoding parameters relate to a quantization step width Q to be used in encoding, a frame type to be used, a maximum search space in motion estimation for detecting image portions belonging to each other in a current image and a reference image, a number of reference frames to be used to be searched for a motion estimation, a mode decision algorithm and/or a search depth for a mode decision.

18. The device according to claim 1, wherein each information signal comprises an audio signal and/or a video signal.

19. The device according to claim 1, wherein the outputs of the encoders are respectively coupled to an input of a multiplexer for a common transmission of the information signals encoded by the encoders via a common transmission channel.

20. The system according to claim 19, wherein the multiplexer is implemented to execute a common transmission in a time multiplex operation such that for each time frame a common time section of the encoded information signals corresponding to the time frame is transmitted.

21. The device according to claim 1, wherein the plurality of encoders is implemented to encode the plurality of information signals in a common time raster segment-wise, so that per time raster range one segment of the respective information signal is encoded and, when an encoding of a current segment of the respective information signal is completed, interrupt the encoding of a next segment of the respective information signal until the beginning of the next time raster range with the encoding of the respective information signal.

22. A method for encoding a plurality of information signals using a plurality of encoders for encoding a respectively different one of the information signals using a joint computing power, wherein each encoder is controllable via at least one respective encoding parameter with regard to its encoding complexity/encoding distortion performance, comprising:
    providing, by a provider, for each of the encoders, signal-dependent information depending on the respective information signal and indicating an encoding distortion of the respective encoder; and
    setting, by a setter, the encoding parameters depending on the signal-dependent information considering the joint computing power such that a combination of encoding complexities of the encoders does not exceed a value which depends on the joint computing power,
    wherein the step of setting and the plurality of encoders cooperate such that, with regard to subsequent time intervals, a distribution of the joint computing power depends on the encoding parameters or an encoding complexity of the individual encoders,
    wherein at least one of the provider and the setter comprises a hardware implementation.

23. A device for encoding a plurality of video signals using a joint computing power, comprising:
    a plurality of video encoders for encoding a respectively different one of the video signals using the joint computing power, wherein the video encoders are implemented to execute a motion-compensated estimation of frames and a lossy encoding of an error of the motion-compensated estimation;
    a provider for providing, for each of the video encoders, signal-dependent information depending on the respective video signal and indicating an encoding distortion of the respective video encoder; and
    a setter for setting encoding parameters of the plurality of video encoders depending on the signal-dependent information, wherein the encoding parameters relate to the motion-compensated estimation and influence an encoding complexity of the video encoders, wherein the setter for setting is implemented to execute the setting considering the joint computing power such that a combination of the encoding complexities of the video encoders does not exceed a value which depends on the joint computing power.

24. A method for encoding a plurality of video signals using a plurality of video encoders for encoding a respectively different one of the video signals using a joint computing power, wherein the video encoders are implemented to execute a motion-compensated estimation of frames and a lossy encoding of an error of the motion-compensated estimation, the method comprising:
    providing, for each of the video encoders, signal-dependent information depending on the respective video signal and indicating an encoding distortion of the respective video encoders; and
    setting encoding parameters of the plurality of video encoders depending on the signal-dependent information, wherein the encoding parameters relate to the motion-compensated estimation and influence an encoding complexity of the video encoders, wherein the setting is performed considering the joint computing power such that a combination of the encoding complexities of the video encoders does not exceed a value which depends on the joint computing power.

25. The device according to claim 23, wherein the setter for setting and the plurality of video encoders cooperate such that with respect to subsequent time intervals a distribution of the joint computing power depends on the encoding parameters or the encoding complexity of the individual video encoders.

26. The method according to claim 24,
    wherein the setting is performed such that with respect to subsequent time intervals a distribution of the joint computing power depends on the encoding parameters or the encoding complexity of the individual video encoders.

27. A non-transitory computer-readable medium having stored thereon a computer program comprising a program code for executing the method for encoding a plurality of information signals using a plurality of encoders for encoding a respectively different one of the information signals using a joint computing power, wherein each encoder is controllable via at least one respective encoding parameter with regard to its encoding complexity/encoding distortion performance, comprising:
    providing, for each of the encoders, signal-dependent information depending on the respective information signal and indicating an encoding distortion of the respective encoder; and
    setting the encoding parameters depending on the signal-dependent information considering the joint computing power such that a combination of encoding complexities of the encoders does not exceed a value which depends on the joint computing power,
    wherein the step of setting and the plurality of encoders cooperate such that, with regard to subsequent time intervals, a distribution of the joint computing power depends on the encoding parameters or an encoding complexity of the individual encoders,
    when the computer program is executed on a computer.

28. A non-transitory computer-readable medium having stored thereon a computer program comprising a program code for executing the method for encoding a plurality of video signals using a plurality of video encoders for encoding a respectively different one of the video signals using a joint computing power, wherein the video encoders are implemented to execute a motion-compensated estimation of frames and a lossy encoding of an error of the motion-compensated estimation, the method comprising:
    providing, for each of the video encoders, signal-dependent information depending on the respective video signal and indicating an encoding distortion of the respective video encoders; and
    setting encoding parameters of the plurality of video encoders depending on the signal-dependent information, wherein the encoding parameters relate to the motion-compensated estimation and influence an encoding complexity of the video encoders, wherein the setting is performed considering the joint computing power such that a combination of the encoding complexities of the video encoders does not exceed a value which depends on the joint computing power,
    when the computer program is executed on a computer.

* * * * *

UNITED STATES PATENT AND TRADEMARK OFFICE
CERTIFICATE OF CORRECTION

PATENT NO. : 8,355,444 B2  Page 1 of 1
APPLICATION NO. : 12/530649
DATED : January 15, 2013
INVENTOR(S) : Faerber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 554 days.

Signed and Sealed this
First Day of September, 2015

Michelle K. Lee
*Director of the United States Patent and Trademark Office*